US006999965B1

(12) United States Patent
Cesarotti et al.

(10) Patent No.: US 6,999,965 B1
(45) Date of Patent: Feb. 14, 2006

(54) METHOD, APPARATUS, AND PRODUCT TO ASSOCIATE COMPUTER AIDED DESIGN DATA AND BILL OF MATERIALS DATA

(75) Inventors: William A. Cesarotti, San Mateo, CA (US); Eric Larkin, San Jose, CA (US); Michael Topolovac, Monterey, CA (US)

(73) Assignee: Arena Solutions, Inc., Menlo Park, CA (US)

( * ) Notice: Subject to any disclaimer, the term of this patent is extended or adjusted under 35 U.S.C. 154(b) by 249 days.

(21) Appl. No.: 10/120,897

(22) Filed: Apr. 10, 2002

Related U.S. Application Data

(63) Continuation-in-part of application No. 09/832,753, filed on Apr. 10, 2001.

(60) Provisional application No. 60/283,077, filed on Apr. 10, 2001.

(51) Int. Cl.
*G06F 17/30* (2006.01)

(52) U.S. Cl. ...................................................... 707/100

(58) Field of Classification Search ................ 707/100, 707/101, 104.1, 10; 705/28, 29
See application file for complete search history.

(56) References Cited

U.S. PATENT DOCUMENTS

| | | | | |
|---|---|---|---|---|
| 4,875,162 | A * | 10/1989 | Ferriter et al. | 705/29 |
| 5,493,679 | A * | 2/1996 | Virgil et al. | 707/104.1 |
| 5,555,408 | A | 9/1996 | Fujisawa et al. | 707/5 |
| 5,655,087 | A * | 8/1997 | Hino et al. | 705/29 |
| 5,740,425 | A * | 4/1998 | Povilus | 707/100 |
| 5,826,265 | A * | 10/1998 | Van Huben et al. | 707/8 |
| 5,918,228 | A | 6/1999 | Rich et al. | 707/10 |
| 5,937,160 | A | 8/1999 | Davis et al. | 395/200.33 |
| 6,058,399 | A | 5/2000 | Morag et al. | 707/201 |
| 6,167,406 | A * | 12/2000 | Hoskins et al. | 707/102 |
| 6,208,995 | B1 | 3/2001 | Himmel et al. | 707/104 |
| 6,212,524 | B1 | 4/2001 | Weissman et al. | 707/101 |
| 6,256,596 | B1 * | 7/2001 | Leite et al. | 703/2 |
| 6,311,207 | B1 | 10/2001 | Mighdoll et al. | 709/203 |
| 6,339,767 | B1 | 1/2002 | Rivette et al. | 707/2 |
| 6,505,205 | B1 * | 1/2003 | Kothuri et al. | 707/100 |
| 6,622,149 | B1 * | 9/2003 | Kellstrom, Jr. | 707/104.1 |
| 6,651,072 | B1 | 11/2003 | Carino, Jr. et al. | 707/104 |
| 6,741,980 | B1 | 5/2004 | Langseth et al. | 707/2 |
| 2001/0056436 | A1 | 12/2001 | Stejskal et al. | 707/200 |
| 2002/0007293 | A1 | 1/2002 | Clemens et al. | 705/7 |

(Continued)

OTHER PUBLICATIONS

Olsen et al., A Procedure-Oriented Generic Bill of Materials, Computers & Industrial Enginerring, vol. 32, Issue 1, Jan. 1997, abstract.*

(Continued)

*Primary Examiner*—Greta Robinson
(74) *Attorney, Agent, or Firm*—Dov Rosenfeld Inventek

(57) ABSTRACT

A method of associating CAD data of an item with an item in a bill of material (BOM). The BOM is stored remotely in a database containing BOMS, not necessarily having the same owner. The method includes for a selected item collecting data from the CAD data of the item, formatting the collected data for transfer, transferring the formatted collected data to a remote location from where the BOM database is accessible, retrieving matching BOM items from a database containing one or more BOMs, comparing the BOM data of the matching items with the corresponding collected transfer data to obtain a match, and associating the matched BOM item with the CAD data of the item. The BOM uniquely identifies items using a unique identifier, and the associating is by attaching to the CAD data of the item the unique identifier used in the BOM database for the item.

50 Claims, 3 Drawing Sheets

U.S. PATENT DOCUMENTS

| | | | | |
|---|---|---|---|---|
| 2002/0007348 | A1 | 1/2002 | Ali et al. | 705/51 |
| 2002/0023109 | A1 | 2/2002 | Lederer, Jr. et al. | 707/511 |
| 2003/0200290 | A1 | 10/2003 | Zimmerman et al. | 709/222 |

OTHER PUBLICATIONS

Blaha et al., Bill-of-Material Configuration Generation, Data Engineering, 1990. Proceddings. Sixth International Conference on Feb. 5-9, 1990, page(s): 237-244.*

Agile Hosting Services, Agile Software Corp., Jun. 28, 2002. Available at www.agilesoft.com.

Agile Software, Bill Nee, "Agile Support for XML Standards", Whitepaper, Agile Software Corp., California, Nov. 2001. Available at www.agilesoft.com.

Trilogy Design, Grass Valley, California. "Personal Parts List Manager & Vendor Database for Windows 95/98/NT". Available at www.info@trilogydesign.com.

Trilogy Design, Grass Valley, California. "Designing or Building Something?", Available at www.trilogydesign.com.

Product Collaboration in the Medical Device Industry, Agile Software Corp. California, Available at http://www.agilesoft.com/wp/index.asp.

Collaborative Manufacturing in the Semiconductor Industry, Agile Software Corp. California, Available at http://www.agilesoft.com/wp/index.asp.

Trilogy Design, Grass Valley, California. "Parts & Vendors: EX Edition—Extended features". Available at www.trilogydesign.com/ex_edition.htm.

Trilogy Design, Grass Valley, California. "Parts & Vendors: Data Security". Available at www.trilogydesign.com/data_security.htm.

Trilogy Design, Grass Valley, California. "Parts & Vendors: Edition Featured Matrix". Available at www.trilogydesign.com/edition_matrix.htm.

"Program Review of Eigner + Partner's axalant cPDm Program", CIMdata, Inc., Sep. 2000. Available at http://www.CIMdata.com.

* cited by examiner

METHOD, APPARATUS, AND PRODUCT TO ASSOCIATE COMPUTER AIDED DESIGN DATA AND BILL OF MATERIALS DATA

RELATED APPLICATIONS

The present application is a continuation in part of U.S. application Ser. No. 09/832,753 titled "SYSTEM AND METHOD FOR MANAGING DATA IN MULTIPLE BILLS OF MATERIAL OVER A NETWORK" filed Apr. 10, 2001, to inventors Eric Larkin, Michael Topolovac, and Janet Yu, the disclosure of which is hereby incorporated by reference.

The present application claims benefit of U.S. Provisional Patent Application Ser. No. 60/283,077 titled "COMPUTER AIDED DESIGN AND BILL OF MATERIALS INTERFACE," filed Apr. 10, 2001 to inventors Topolovac, et al., the disclosure of which is hereby incorporated by reference.

The present application is related to U.S. Provisional Application Ser. No. 60/195,918 titled "SYSTEM AND METHOD FOR HOSTING MULTIPLE BILLS OF MATERIAL FOR MULTIPLE COMPANIES IN A SINGLE NAMESPACE" filed Apr. 10, 2000 by Eric Larkin and Michael Topolovac; U.S. Provisional Application Ser. No. 60/206,219 titled "SYSTEM AND METHOD FOR TRANSPARENT ELECTRONIC PROCESSING" filed May 22, 2000 by Eric Larkin and Michael Topolovac; U.S. Provisional Application Ser. No. 60/206,221 titled "SYSTEM AND METHOD FOR VENDOR PERFORMANCE TRACKING" filed May 22, 2000 by Eric Larkin and Michael Topolovac; U.S. Provisional Application Ser. No. 60/210,935 titled "SYSTEMS AND METHODS FOR UTILIZING MULTIPLE BILLS OF MATERIAL FROM MULTIPLE COMPANIES STORED IN A SINGLE NAMESPACE" filed Jun. 12, 2000, by Eric Larkin, Michael Topolovac, and Janet Yu, and U.S. Provisional Patent Application Ser. No. 60/283,061, titled "ACCESS CONTROL SYSTEM FOR SUPPLY CHAIN MANAGEMENT," filed Apr. 10, 2001 to inventors Topolovac, et al.; and concurrently filed U.S. patent application Ser. No. 10/120,898 titled "SYSTEM AND METHOD FOR ACCESS CONTROL AND FOR SUPPLY CHAIN MANAGEMENT VIA A SHARED BILL OF MATERIAL," filed Apr. 10, 2002 to inventors Larkin, et al., assigned to the assignee of the present invention. Each of these patent applications is hereby incorporated herein by reference.

BACKGOUND

This invention relates to a system that facilitates the management of part lists. More particularly the invention relates to a system that enables the linking of the item in a remotely stored bill of material (BOM) to one or more sets of computer aided design (CAD) data for that item, and for the transfer of data between CAD data and remotely stored bills of material (BOMs).

CAD systems are commonly used for designing items, e.g., for producing engineering drawings. A product may contain one or more component or subassembly, and each of these may have one or more of mechanical, electrical, thermal, and chemical aspects. Consider for example an automobile. A modern automobile includes many mechanical, electrical, and electronic subassemblies. A CAD system is usually provided in the form a CAD software application, and different CAD software applications might be used to design these different components in an item. Such different CAD application may also be located at different facilities.

Different CAD applications may even be used to design different aspects of the same component or subassembly. Consider, for example, an electronic subassembly. An electrical CAD application may be used to design an electronic circuit, while a different electrical CAD application may be used to design the electrical aspects of the circuit carrier, e.g., a printed circuit board onto which electronic components are mounted. Additionally, a mechanical CAD application may be used to design the mechanical aspects of the circuit carrier, and an electromagnetic CAD system may be used to design aspects to minimize electromagnetic interference.

During development and manufacturing of a product, elements, parts or components of the product are often kept in a structured item list called a bill of materials (hereinafter BOM while the plural form, bills of material, abbreviated as BOMs). For each such product, a BOM is used to keep track of information such as the number of parts used in manufacturing the product, the identification of parts, part vendors, part manufacturers, and part costs. The BOM may also be used as an index or organizational tool for the documentation of a product's components such as component datasheets and mechanical drawings. Furthermore, in some instances BOMs include non-material items such as assembly and finishing processes, machining steps, and connections. Finally, BOMs may include reference items such as tooling or agency certifications that are not actually included in the product itself, but which are required for its manufacture. A bill of materials is a hierarchical data structure that describes all the components for manufacturing an item. Such a hierarchical structure may be representable a tree with each node of the tree an item of a BOM. An item, i.e., the node of the tree, may be an article, a process, the material used by the process, and so forth. A node of a BOM may itself be represented by a BOM. An item in a BOM, for example, may be a subassembly, and there may be a separate BOM that describes that subassembly, including the components, and in some cases the process for creating a component.

Each item can therefore be represented as a node in a BOM. A BOM typically will uniquely identify such an item, e.g., with a unique identifier. Two or more CAD applications may be used for a single item in a BOM. The same part in a BOM may then be associated with two or more sets of CAD data. Consider for example, a single electronic component. The BOM ideally would include all the information required to manufacture that component, including mechanical aspects and circuit design aspects, including the electronic components used. The mechanical aspects may have been designed on a mechanical CAD system and electronic circuit may have been designed on a CAD application for electronic circuit design. Each of these applications maintains different data about the same component. The mechanical CAD system includes mechanical properties, including in some cases heat dissipation properties, and such information may not be kept in either the BOM or the electronic CAD application. Similarly, some of the electrical properties maintained by the electronic CAD application may not be maintained by mechanical CAD data for the same element.

It is common practice for organizations engaged in the design of items to assign each item a locally unique identifier in the form of a "part number", and for persons within the organization to manually record the part number of each item in the BOM and in one or more of the CAD applications used to design the item. However, this practice has numerous shortcomings. The assignment of part numbers for new item is often controlled by a central authority in an organization, and it may be necessary to create and manage a BOM and to use CAD applications before part numbers have been assigned by the central authority. In addition, organizations often rely on imperfect mechanisms to maintain the uniqueness of part numbers, with the result that two different items may be assigned the same part number. In addition, the format of assigned part numbers and method of recording part numbers within a BOM and within a CAD application is idiosyncratic to each organization. Further, assigned part numbers are generally only locally unique within an organization, with the result that the same part number may be assigned to different items by different organizations. Further, it is sometimes necessary to change the part number that is assigned to an item.

The type of data stored in a BOM may be different from the type of data that a CAD system maintains for a product, for an assembly, or for a part of a product. The BOM may include information that is not maintained by the CAD system, and the CAD system likewise may include information not relevant to the BOM.

It desirable to associate the information maintained in a BOM about an item to the information maintained in one or more CAD systems about that item. It is desirable to do so in a way that addresses the shortcomings of manually assigned part numbers.

It also is desirable to be able to synchronize the information maintained in a CAD system to that in the BOM so that any changes made in a BOM can be updated in the associated CAD data, and there is a need to be able to synchronize the information maintained in a BOM so that any changes made in CAD data of an item can be updated in the associated BOM.

Not only is it desirable to associate the information maintained in a BOM to that in CAD data, i.e., similar information that is maintained in both the BOM and CAD data, but there are also advantages in making CAD data, e.g., information that normally is not stored in a BOM accessible to a user working on a BOM. Thus it is desirable to provide the capability of downloading CAD data about the item that normally would not be available to a BOM to a location accessible to the BOM, and also to enable such downloaded data to be easily updated.

Different BOMs may use the same components. It would also be advantageous to associate the CAD data in one or more CAD applications about an item to the one or more BOMs that include the item or a similar item.

Above referenced and incorporated herein U.S. patent application Ser. No. 09/832,753 to Larkin, et al. describes a system and method for maintaining a plurality of bills of material from multiple owners in a single location possibly remote from the users, and a method implemented as a software application that allows a remote user working at a user client system to manipulate and maintain such a BOM. The application software may on an application server system that is remote from the user client system, and the plurality of bills of material may be stored in one or more locations remote from the user client system and in some embodiments, remote from the application server system on which the application software executes.

BOMs are structured in particular ways. Once the CAD data of an item is associated with the BOM information for that item, there may be a need to download and store additional information, e.g., from the CAD data, to associate with the BOM information, and further to store the additional information in a data server that is at a location remote from the location where the BOMs are stored.

SUMMARY

Described herein is method of associating CAD data of an item with an item in a bill of material (BOM). The CAD data for the item in different CAD systems can thus be associated with the item in the BOM, thereby providing an association between the BOM item to many different CAD data sets for that item. The BOM is stored remotely in a database containing BOMs, not necessarily having the same owner. Briefly, the method includes for a selected item collecting data from the CAD data of the item, formatting the collected data for transfer, transferring the formatted collected data to a remote location from where the BOM database is accessible, retrieving matching BOM items from a database containing one or more BOMs, comparing the BOM data of the matching items with the corresponding collected transferred data to obtain a match, and associating the matched BOM item with the CAD data of the item. The BOM uniquely identifies an item using a unique identifier, and the association is maintained by attaching to the CAD data of the item the unique identifier used in the BOM database to identify the item. Other embodiments also are described herein.

DETAILED DESCRIPTION

Figure 1:
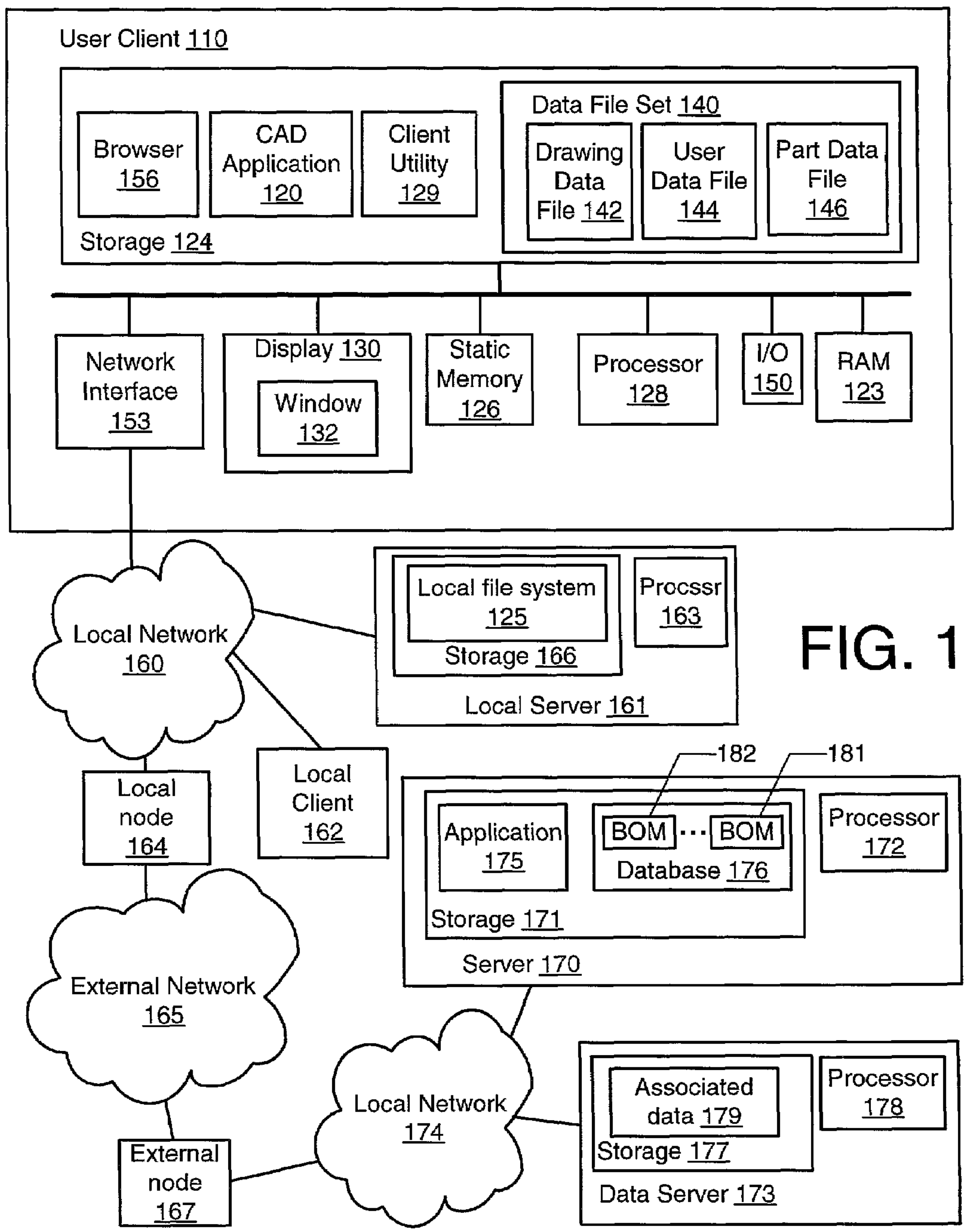
FIG. 1 illustrates in simplified form a configuration in which one or more embodiments of the invention may operate.

FIG. 1 illustrates in simplified form a configuration in which one or more embodiments of the invention may operate. A user client computer system 110 can run a CAD (computer aided design) application 120 that is used to design one or more elements of an item. The client 110 includes one or more processors 128, a display 130, local storage 124, RAM 123, static memory 126, e.g., a cache, input/output interface 150, and a network communication interface 153. In one embodiment, the input/output interface 150 is connected to a pointing device such as a mouse, to a graphic data tablet, and other input/output devices. The network communication interface 153 provides access to a local network 160 connected to which is a local server system 161 and none or more other local client systems such as client 162. The local sever includes one or more processors 163 and storage 166 containing a local file system 125. The CAD application may be resident on the user client 110, e.g., in local storage 124, in the local server 161, or on another local client such as client 162. When loaded and operating in the user client 110, the CAD application is resident on the client, e.g., distributed between the computer's RAM 123 and static memory 126, and uses the client's display 130 to present images to a user through one or more windows 132. The CAD application 120 has access to a set of CAD data files 140 that in one embodiment is stored in local storage 124 and in another embodiment is stored in the local file system 125 on the local server 161. Different CAD application store the CAD data in different ways. In one embodiment, the CAD data files include one or more part data files 146 that contain, in the case of mechanical part data, the physical geometry of parts, a drawing data file 142 that includes additional part data for the parts, such as assembly information in the case of mechanical parts, and a user data file 144 that includes user information. Parts of the CAD data files are periodically stored in RAM 123. Note that more than one CAD application may be operable on the user client 110.

The client's local storage 124 includes file transfer software 156, e.g., software that implements a file transfer protocol such as ftp and the hypertext transport protocol (http) to retrieve one or more Web pages. In one embodiment, the file transfer software 156 includes a Web browser such as Microsoft Internet Explorer® or Netscape Navigator® that provides for displaying Web pages on the display 130 and interacting with elements on the displayed page.

The local area network 160 is coupled to an external network 165, such as the Internet. The coupling may be via one of the other clients 162, the server 161, or, as shown in FIG. 1, a local node 164 of the local network 160. The external network 165 is coupled to a server 170 (the "BOM server"). The coupling may be direct, or, in one embodiment as shown in FIG. 1, via a node 167 and a second local network 174. BOM server 170 includes server storage 171 and one or more server processors 172. The server storage 171 includes at least one application 175 for accessing at least one database 176. The database 176 includes a set of BOMs each having an owner. Two BOMs, 181 and 182 are shown. The BOMs may have different owners. The application 175 is called the BOM application herein. In one embodiment, the database 176 resides on the BOM server 170 in storage system 171. In one embodiment, a data server 173 is included, and both the data server 173 and the BOM server 170 are connected to the second local network 174. The data server 173 includes data storage 177 and one or more processors 178. In one alternate embodiment, the database 176 resides in storage system 177 of the data server 173, while in a second alternate embodiment, the data server 173 is connected to the external network 165 and BOM server 170 accesses any data in storage 177 of the data server via the external network 165. In yet another alternate embodiment, no separate data server is included, and any data additional to the BOM data in database 176 is stored in the storage system 171 of the BOM server.

As described in above referenced and incorporated herein by reference U.S. patent application Ser. No. 09/832,753 to Larkin, et al., a user can view and manipulate a BOM such as BOM 181 stored in database 176 at the client 110 using the browser application 156. All communication is secure between either the CAD application or the browser at the client and the BOM application on the BOM server are secure, e.g., using SSL. A BOM is representable as a tree with any node of the tree representing an item. Associated with each node may be several pieces of information such as potential suppliers, price, owner, and so forth. In one embodiment, the BOM is stored as part of a relational database system containing a collection of tables that represent the owners, the items belonging to the owner, and users of the system. Each item in a BOM is uniquely identified in the in database 176. In one embodiment, the unique identification uses a unique identifier. In another embodiment, the unique identification uses a locally unique part number in conjunction with qualifying information that identifies the local domain under which the part number is guaranteed to be unique.

One method of preparing a BOM is from CAD data. Consider an item designed on a CAD system, e.g., CAD application 120 and suppose that the item includes a plurality of elements. Each of the elements of the item my each also by comprised of a plurality of elements, such that the item may be described by a hierarchy representable as a tree structure, with each node of the tree representing an element. A typical CAD application provides a method for collecting the information on the hierarchy. The parent patent application (U.S. patent application Ser. No. 09/832,753) describes creating a BOM from such a hierarchy.

Aspects of the invention provide for communication between the BOM application 175 and the CAD application 120 by associating CAD data about an item to the BOM data of that item. One aspect provides communications from the CAD application 120, e.g., from CAD data to the BOM application. Such communication includes to the BOM information on items imported from standard parts file, information on custom items, modification dates, the number of similar items, the steps involved in forming a custom item, information on quote requests on specific parts. Another aspect provides communication from the BOM to the CAD system. Possible communications from the BOM to the client, e.g., to the CAD data include but are not limited to a parts list, e.g., as a pop-up window, including BOM data selected by the user, providing to the CAD application alternative parts, alternative supplier lists for parts, alternative lists of parts, prices, quotes, part tags. The user of the CAD application can update time/cost estimates with actual values, gain access to an online database of standard parts for import into CAD. Other types of information that might be available in a BOM include images, specifications, price, vendor information, and data conversion of specification sheet drawings to CAD data.

In one aspect, a client utility 129 is provided that allows BOM data or links thereto to be embedded in the CAD file. In one embodiment, client utility 129 is a "plug-in" to the CAD application. A "plug-in" is a software program that extends the capabilities of an application. In another embodiment, client utility 129 is a separate program that executes independently of CAD application 120 but which can read or modify both read and modify CAD data. Communications between the utility 129 and the BOM server 129 are secure, e.g., using SSL.

In another aspect, associating CAD data with a BOM provides for data generated in a CAD file to be stored in the BOM or stored external to the BOM but associated with the BOM. Views of this CAD data are then available to the different entities that might access a BOM, such as an accounting, purchasing, department, and so forth, personnel of which might not otherwise have access to CAD data.

Different CAD data related to the same item may be associated with the BOM data of that item, thus providing a set of links between the one BOM item and many sets of CAD data, some of which may be produced by different CAD systems that may be operating at different times at different locations.

Figure 2:
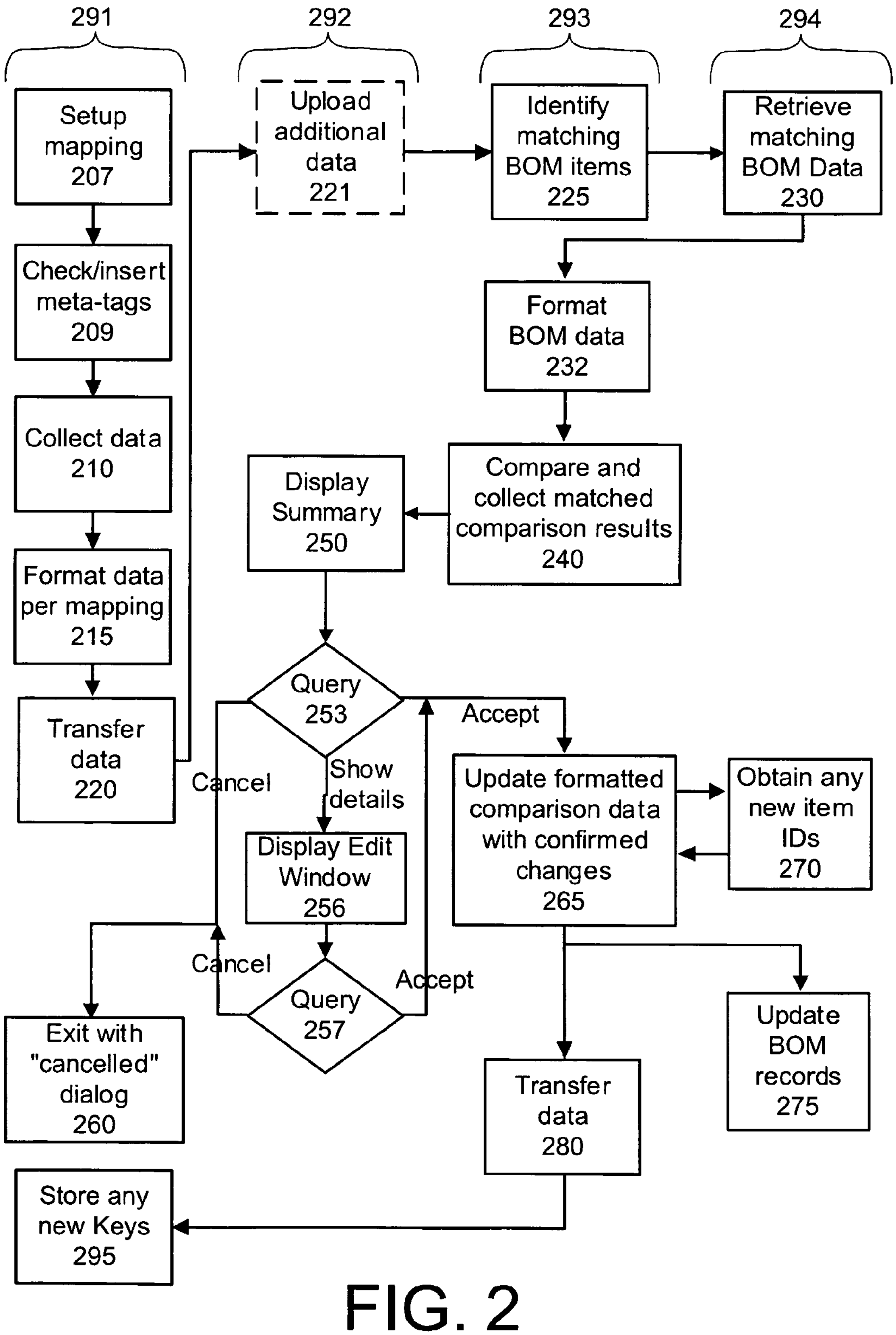
FIG. 2 illustrates in flowchart form a method embodiment of one aspect of the invention.

FIG. 2 illustrates a flowchart of one method embodiment of the invention. The method associates CAD data with the item in BOM data. The associating leads to an association between the item in a BOM residing in database 176 and the CAD data related to the item, e.g., in a user data file 144 or one or more drawing data files 142.

CAD data, for example, CAD data of an assembly, often includes a part list. The CAD part list typically does not include the same information as in a BOM, and may not be in the same format as the data in a BOM. One aspect of the invention allows the items in a part list in CAD data to be associated with items in a BOM. Thus, a user accessing the CAD data can obtain from the remote BOM database information about any part in the part list, which includes data that may not be used in the CAD data.

In one embodiment, the associating provides a mapping of data fields used by the CAD application for a part to the corresponding data fields that a BOM uses for the part. The field mapping includes mapping the one or more fields the CAD system uses to identify a part to the one or more corresponding BOM identification fields. For example, CAD data may include an item number and an item name to identify the item. Each of the BOMS may similarly use an item number and an item name to identify the part, but stored in a field that has a different name. In one embodiment, the mapping from the CAD data to the BOM data is attached to, e.g., stored in the CAD data. In one embodiment, the unique identifier used in the BOM for an item is data is attached to the CAD data, e.g., by being stored within the CAD data.

The method of FIG. 2 basically compares CAD identifying data to BOM identifying data in a BOM stored in database 176. If the identification in the CAD data and the BOM data match, the item in the CAD data is associated to the item in the BOM. If there are several matches of item number, and of name when a match of both is required, one embodiment presents information on the matching BOM items to the user. The user then selects the matched BOM item for association with the CAD data item. If there are no matching items, a new item is created in the BOM corresponding to the item in the CAD data.

The embodiment of FIG. 2 is now described in more detail. In one embodiment, some steps of the method are implemented in software in the form of client utility 129 that resides in local storage 124 (see FIG. 1). In one embodiment, the client utility 129 is a "plug-in" directly integrated with the CAD application 120. In a first step 205, a client utility 129 that resides in local storage 124 (see FIG. 1) is activated in user client 110 and associated with the CAD application 120. Other steps of the method of FIG. 2 are implemented in the browser 156, and some steps in the BOM server 170. FIG. 2 is organized into columns that indicate where the steps are carried out. The column labeled 291 is at the application, e.g., the client utility 129 and/or the CAD application 120. The column labeled 292 is at the browser 156 running on the client 110. The column 293 is at the BOM application 195, and the column reference numeral 294 is at the BOM database.

In setup step 207, one or more setup tasks are executed to select the CAD data of a item to be associated, and to define how the CAD data of the item, e.g., the fields in a user data file 144 or in one or more drawing data files 142 of a user data file is to be compared with the BOM data that resides in database 176. The step 207 defines a mapping of one or more CAD data fields to the corresponding fields in BOM data. The mapping also may relate the formats, e.g., how the CAD data describes one or more properties to how a BOM in database 176 describes the same information. The mappings include mapping default data regarding an element such as the element part number or the name of the element or both to the corresponding fields in the BOM data for such data. For example, the names or formats or both names and formats of these default fields may be different in the CAD data and in BOM data. In addition to default data, the mapping may also include user-defined data regarding an item.

The mapping is stored the first time the utility 129 is used on the CAD data, and may later be modified, and used to associate other items, e.g., drawings or drawing elements with BOM data. Step 207 is thus typically carried out at least once on the CAD data, e.g., the first time the utility 129 is executed on CAD data.

In one embodiment, a different mapping is used for each set of CAD data, and the mapping is incorporated with the CAD data, using, for example, the capability that most modern CAD applications provide for defining and including user-defined data within a CAD data file. In this manner, different types of mappings for associating CAD data with BOM data may be used. Different CAD applications may thus relate different types of CAD data on an item to the same BOM item. The mapping provides for automatic translation of CAD data of an item to the BOM data. In another embodiment, the mapping is stored in a mapping data file external to the CAD data. The mapping data file may be stored as part of data file set 140 or in the local file system 125 of the local server 161 (See FIG. 1).

One embodiment of the invention includes having one or more meta-tags associated with the CAD data of an item. Associating a meta-tag in one embodiment comprises including the meta-tag in the CAD data. The meta-tags include the unique means for identifying the item in the BOM data in the form one or more identification keys by which the corresponding item in a BOM is uniquely identified in the BOM database 176. The BOM application uses the keys to both uniquely identify and efficiently retrieve BOM data.

In one embodiment, the successful associating of CAD data to the BOM is indicated by the inclusion in the CAD data of a valid meta-tag that includes one or more identification keys that the BOM uses to identify the associated BOM data.

In step 209, the CAD data of each element that is to be associated with BOM data is checked to determine if there is already a meta-tag containing one or more keys associated with that element. If not, a meta-tag is created by the client utility 129 and inserted into the CAD data. Such a newly created meta-tag is initially invalid and would later contain the at least one identification key that the BOM application uses as provided by the BOM application 175. In one embodiment for which the CAD application 120 includes the capability of inserting one or more user-defined data fields into the CAD data, the inserting of the meta-tag is into a-defined data field. If a meta-tag already exists, the meta-tag may need to be modified in the CAD data or the BOM application or both. A meta-tag is modified as each new element is defined or an old element is updated. As described below, the tag data modified in the BOM is then updated in any associated CAD data, and vice versa.

In one embodiment, the meta-tag includes further version information, modification date/time data, location data, and user information data. What data is included in a meta-tag may be modified by the user, e.g., using the utility 129 or the BOM application 175.

The adding or modifying of meta-tags, i.e., step 209 may be executed each time an existing elements is changed or a new element added in drawing data file 142 and part data file 144.

A step 210 collects data on an item to be associated with the BOM data. In one embodiment, step 210 and the associating occurs when an element is defined in the CAD application, when an element is modified in the CAD application, then the CAD data is saved, and when the user issues a specific command to collect data for BOM association. In one embodiment, utility 129 adds to the CAD application such a specific command, for example as a clickable screen button on a user interface of the CAD application that appears on the display 130 The collected data optionally includes additional information that includes either partial or full specifications for the part. In one embodiment, the conditions that trigger collecting CAD data for BOM association are settable, e.g., using a preference menu that is added to the CAD application user interface. Optional conditions include periodically, e.g., every settable number of minutes, whenever data is saved, whenever CAD data is backed up, and so forth.

In one embodiment, the data collected in step 210 includes basic and additional information from the CAD data. The basic information includes the identification of that item in the CAD data. The additional information includes either partial or full specifications for the part. The data optionally includes one or more of assembly relationships, the properties of an item, any user-defined information, or the location of data files on user client 110. Full specifications include the full CAD data of the element, e.g., the entire three-dimensional representation of the element in the case of a mechanical element, associated elements, custom descriptive information, and all the data included in meta-tags. Partial specifications include a subset of full specifications and may include only summary information such as item number and item name.

In a step 215 client utility 129 formats the collected data into a data suitable for data transfer. In one embodiment, the format for transfer is XML. The mapping of step 207 is used to format the data.

In step 220 data in XML is transferred to the server 170. In the configuration of FIG. 1, the transfer is via network interface 153, the local network 160, and the external network 165 to the server 170.

One aspect of the invention provides for transferring the additional information, e.g., additional binary information to be transferred and linked with the BOM data, either by storing the additional information with the BOM data or, in one embodiment, as associated data 179 in the storage 177 of the data server 173. Furthermore, some of the additional information may be stored as part of the local file-system 125 on local server 160. The storing of such additional data, e.g., from local server 125 as separate data in the data server may occur by secure uploading process described in above-referenced, incorporated by reference, related, and concurrently filed U.S. patent application Ser. No. 10/120,898, titled "SYSTEM AND METHOD FOR ACCESS CONTROL AND FOR SUPPLY CHAIN MANAGEMENT VIA A SHARED BILL OF MATERIAL," filed Apr. 10, 2002. Such secure uploading is used for example to ensure that the data in data server 173 is stored in encrypted form and that once the data is stored, the data server can only access, i.e., decrypt the data, with authorization from the BOM application 175. Furthermore, once the user has authenticated himself or herself to the BOM application, the upload may proceed without the user needing to further authenticate himself or herself to the data server 173. For such an upload, the user at client 110 requests the upload from the BOM server. The BOM server provides to the user a Web page (called an "upload page") that includes an attached ticket issued by the application 175 for the transfer and a redirect to the data server 173. In one embodiment, the user uses the upload page to identify the information to be uploaded, and in another embodiment, the information to be uploaded is the additional information collected in step 210 and no further user interaction is needed. Using the redirect, the information is transferred with the ticket to the data server 173 for storage. The data server receives the ticket and forwards it to the application 175 for authentication and authority to proceed. The application 175 authenticates the ticket and sends the data server an acknowledgment that that data server is now authorized to proceed. In one embodiment, the ticket includes only identifying information for the transfer, and an encryption key that the data server 173 is to use to encrypt the data prior to storage and a specified location in storage 177 are included in the acknowledgement sent by application 175. In another embodiment, the ticket includes the encryption key and the specified location in storage 177. In one embodiment, the encryption key is a one way key such that a different key matched to this encryption is needed to decrypt the data. The data server stores the data as associated data 179 in the storage system 177. This process of uploading additional data is shown in FIG. 2 as optional step 221. While the step is shown in FIG. 2 as occurring in the browser, it is to be understood that this step includes steps performed at the client, at the BOM server 170 by the BOM application, and at the data server 173.

At server 170, a step 225 identifies all of the unique elements in the data transferred in step 220 using one or more pieces of information about the element ("matching information"). In one embodiment, the matching information used for step 225 includes one or more of the item name, the item number, and the item identifier for the item.

In a step 230, the BOM data in database 176 that are associated with the same user and that match the matching information are retrieved. The retrieved BOM data is thus BOM data that are candidates for associating with CAD data. In the embodiment wherein XML is used as the transfer format, the retrieved BOM data is formatted into XML in step 232.

In a step 240, the detailed BOM data of the items is compared with the data received through step 220. Because the data 220 and the BOM data have been formatted to XML, e.g., according to the mapping, the comparison can by of comparable fields. Step 240 thus includes collecting the comparison information, e.g., in the form of a list of new not yet BOM-associated items and, in those embodiments where the comparison is not already in a format suitable for presentation, converting the comparison information to a format suitable for presentation to the user in the user client 110. In the XML embodiment, no such conversion is needed if the data is presented to the user in a browser window. This data is transferred via external network 165 and local network 160 to the user client 110 and displayed within window 132 (step 250). In one embodiment, window 132 may be a daughter window of CAD application 120, and the data format is a format suitable for display within the CAD application. In an alternative embodiment, the Web browser 156 is used to present the material to the user, and the data format is a format suitable for a browser, such as HTML or XML.

In an alternate embodiment, the comparison step 325 may be carried out not in the BOM application 170, but in the user client 110. In such an alternate embodiment, the collection step 240 occurs on the formatted retrieved BOM data and this data is then transferred to the user client 110. The comparison step 235 is now carried out at the user client and the comparison results displayed to the user.

In one embodiment, the displayed data includes a summary of new additions and changes that would be made to the BOM if the user accepts the summary. In a step 253 the user is offered a choice of accepting, canceling, or seeing the data in a more detailed view for editing. If the user selects editing, detailed information regarding each item is presented in an editable form in a step 256. In a step 257 the user is again offered an opportunity to cancel or accept changes. At either decision point, if the user selects to cancel the update, a dialog is displayed in a step 260 indicating that the update has been cancelled. In the embodiment of FIG. 2, steps 250, 253, 256, and 257 are accomplished through either the browser. In an alternate embodiment, these steps are carried out through an interface presented by client utility 129.

Collected data for those items that are accepted in either step 253 or step 257 is used to update the comparison data in step 265. As part of this, any changes and additions to the BOM data are identified, and further, any such additions for which identification keys do not yet exist in the BOM database 276. New BOM item IDs, and new or modified identification keys are obtained from the BOM database in step 270. Recall the identification keys provide a unique identifier for an item.

In a step 275, any changes required to the BOM data are made, including, for example, deleting what BOM data needs to be deleted, and creating what new BOM data needs to be created. In one embodiment wherein the formatted data is step 265 is in XML, the XML is converted into the appropriate database commands.

In a step 280, any new or modified identification keys in database 176 are formatted for transfer to the user client 110 and transferred. In the embodiment in which the transfer format is XML, no formatting is required for the transfer. In step 295, the keys the new or modified identification keys are inserted into tags within the CAD data for each item associated with the identification keys. These identification keys provide for tracking the associated items through future changes.

In this manner, by providing the unique BOM identifier for the item in the CAD data, the BOM data related to an item is made available to CAD data. Furthermore, when more than one set of CAD data exists for one item, the sets of CAD data can thus be associated with the one item in the BOM, thereby providing an association between the BOM item to many different CAD data sets for that item. The different CAD data sets may be for use in different CAD applications, be of a different type, be for different applications, and be created or used at different locations remote to the BOM data at different times. Furthermore, by providing a mapping of one or more fields in the CAD data to a format understandable by the BOM, a mapping of CAD data to BOM data is maintained that can be used to update BOM data.

Note that in some embodiments, the process illustrated in FIG. 2 may further include updating the data stored in the BOMs to which the CAD data of an item is associated with more data. For example, there may be quote data present in the client 110, e.g., as part of the CAD data files 140, and such quote data is delivered to one or more BOMs in the database of data server 173 at the same time as other data in the process described by FIG. 2. Other data that may 7 be transmitted for updating BOMs includes, without limitation, requests for quotes on specific parts, machining steps involved in manufacturing, and user estimates of part costs. In such alternate embodiments, the data collection step 210 includes searching for such data for transmission and inclusion in any associated BOMs.

Once the association is complete, in one embodiment of the client utility 129, a user can access complete BOM data from within the client utility 129, including estimates of costs, prices, quote request forms, part identification tags, alternative parts, and lists of vendors. Cost estimates for a BOM element or a set of elements may be updated by a user when actual costs are known.

As described in the parent patent application (U.S. patent application Ser. No. 09/832,753), views of a BOM are available to other parties. Thus, any changes made in CAD files are immediately and automatically reflected in these views. BOM and CAD data are both divisible into versions such as “draft”, “proposed”, and “final”. Views of these versions are managed by the BOM application’s access control system, described in related U.S. patent application Ser. No. 60/283,061, titled “ACCESS CONTROL SYSTEM FOR SUPPLY CHAIN MANAGEMENT,” and incorporated herein by reference.

Another aspect of the invention provides for comparing an original element to an existing element within a CAD file or an existing element within a BOM. Comparisons may be based on various features, depending on the application, including in a mechanical element example, the physical features such as a bolt circle or properties such as color or vendor. Visual comparisons of two parts may be made by loading the CAD data of each part into CAD application 120. Each part has an associated BOM. The comparison may be made on properties stored in a BOM, or those on the CAD data. One embodiment performs property comparisons at the BOM server using BOM application 175, while another performs the comparisons at the user client using client utility 129. Consider the case of the comparison carried out in the BOM application. The same or modified versions of the steps of FIG. 2 may be used to transfer the data from user client 110 to the BOM server 170, obtain any needed BOM data for the comparison. Note that step 225 is trivial in the case that the CAD data for an item is already associated; the one or more identification keys may be used to retrieve the BOM data. In the modified step 250, the client utility 129 displays a list of differences between the two items and automatically indicating when a complete match is found. In this way a CAD drawing file 142 can be searched for items previously associated with a BOM.

In some embodiments, when unique matches are found in the comparison step 240, no interactive editing of changes is included. The necessary changes and associating are automatically carried out.

When data are uploaded from a CAD application 120 to a BOM file, applications running on server 170 compare date information from elements within the CAD drawing with data in the BOM. This information is used for version control and users are given the option of reading updated data into their CAD application files 140. Date and time stamps are also used to track items that are duplicated in a CAD drawing. For example, if an element is copied its associated tags are duplicated as well. Time stamps are used to determine the original element and the new elements are provided with new unique identifiers. The fact that a series of elements are identical or similar is retained in the BOM data.

In one embodiment, the comparison decisions can be automatic by always selecting the latest time stamp. When full specification data is transferred in steps 220, 221, and 280, such an association and automatic update process can be used to keep multiple CAD users in different locations synchronized to the CAD data if full specification data was included, i.e., when full CAD data is uploaded, e.g., to the data server and associated with the BOM item.

Once an item in the CAD program is associated with an item in a BOM in the BOM database, a user working accessing the CAD data can download from the BOM additional data about that item or assembly. This can be done any later time.

Above-referenced, incorporated by reference, related, and concurrently filed U.S. patent application Ser. No. 10/120,898, titled "SYSTEM AND METHOD FOR ACCESS CONTROL AND FOR SUPPLY CHAIN MANAGEMENT VIA A SHARED BILL OF MATERIAL," filed Apr. 10, 2002 describes how additional data that was uploaded to be securely stored in encrypted form in the storage 177 of the data server 173 can be downloaded in a manner such that once the user has authenticated himself or herself to the BOM application, the download may proceed without the user needing to further authenticate himself or herself to the data server. As an example, the additional data may be the latest CAD data of an item in a BOM, and the downloading may be updating the CAD data at a remote client. For such a download, the user at client 110 requests the download from the BOM server. The BOM server 170 provides the user at the client 110 a ticket issued by the application 175 for the transfer and a redirect to a location in storage 177 of the data server 173. The ticket includes a decryption key that the data server uses for decrypting the requested data. Using the redirect, the information is requested from the data server. Upon receiving the request with the ticket, the data server sends the ticket to the application 175 at BOM server for authentication and authority to proceed. The application 175 authenticates the ticket and sends the data server an acknowledgment that that data server is now authorized to proceed. The data server then retrieves the requested data from its storage system 177, decrypts the data and downloads the data to the user client. The decryption key is now discarded by the data server. In one embodiment, the decryption key provided in the ticket issued by the BOM server is designed to have a short validity time, i.e., to expire soon after issue to ensure that the data server cannot re-use the key. In another embodiment, the decryption key is a "use-once" decryption key.

Embodiments of the invention fully support expected differences between CAD and BOM data. Items found in a BOM but not necessarily in a CAD file include assembly steps, glue, functional but non-material parts (e.g. computer code or light), paint, etc. These items may be identified in the BOM as being "non-modeled" items. Items such as tooling may be included in a BOM with zero or fractional quantity and are preferably associated with a physical item in a CAD drawing. Likewise, assembly steps included in BOM data are preferably associated with CAD file elements. The associations are established through the property fields in each item.

Standard, e.g., already designed parts may be used in a design. In such a case, the data for such parts is imported into CAD application 120. For example, a parts file of available parts may be available on the local server 161, or elsewhere. One or more of such standard parts may already be associated with a BOM, as indicated by the existence of an identification key in the CAD data of the standard part, e.g., in a meta-tag. One aspect of the invention provides for re-use of parts that are already associated with BOM data.

Figure 3A:
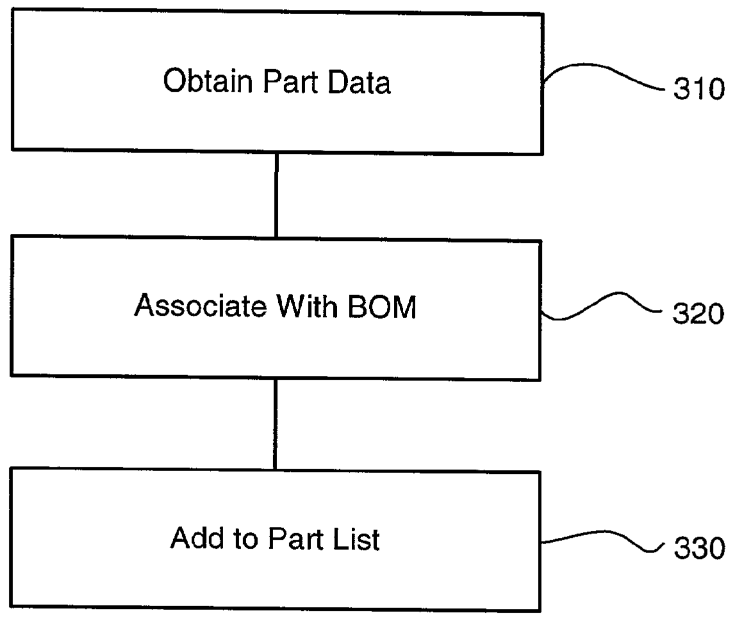
FIGS. 3A and 3B illustrate in flowchart form associating standard parts with items in a BOM database and using such an association according to one embodiment of the invention.

FIG. 3A illustrates one embodiment of a process in which parts are developed, associated with a BOM and made available for re-use as necessary. The association process operates in the user client 110. In step 310 the part data of a part is generated using the CAD application 120 or selected from an existing database of parts. In a step 320, the part is associated with a BOM. In one embodiment, the associating includes inserting information into the BOM, including summary information about the part, such as the item name, item number, item designer, and so forth, and information on one or more properties of the part such as, in the case of a mechanical part, the material the part is made of, in the case of an electronic part, the tolerance and temperature operating range, and so forth, and a pointer, e.g., an address for retrieving a full specification of the part, e.g., in the form of the full three dimensional CAD data for the part in the case of a mechanical part. In an alternative embodiment the inserted information includes the full part specification. In a step 330 summary information about the part is added to a local part list accessible from within the CAD application 120 that describes what standard parts are available. In one embodiment in which the CAD data includes a part data file 146, the part list is included in the part data file 146.

Once a part list is set up, any included part data in that list for any part is available whenever required by a user.

Figure 3B:
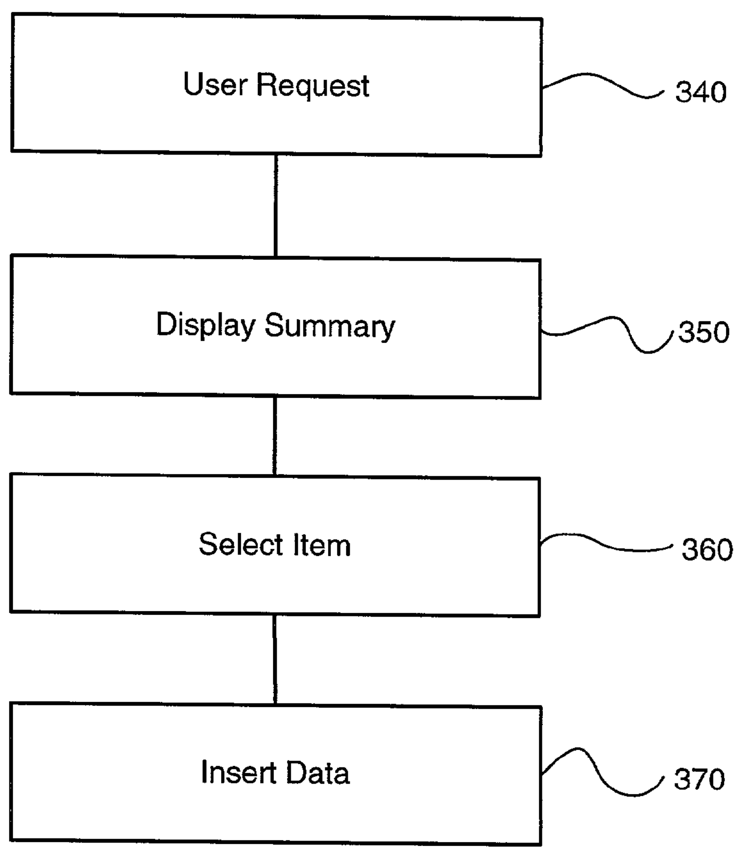

As an illustrative example of part data re-use, FIG. 3B shows a simple flow chart for re-using a standard part that was previously BOM-associated. The process occurs in the client 110. In a step 340 a user requests a listing of available, i.e., previously BOM-associated parts from within the CAD application 120. In a step 350, a list of summaries of available parts is displayed to the user. An item is selected by the user in step 360 and, in a step 370, the full specification, e.g., the full three-dimensional data for that part if a mechanical part, is retrieved and inserted into the local CAD file 142. This insertion includes a meta-data tag that contains the one or more identification keys that allow identification of the part and correlation with BOM data.'

Associating a directory of standard parts with one or more BOMs provides considerable advantages. For example, properties such as pricing, vendor, color, etc., of parts, that normally are not used in the CAD process are accessible from within the CAD file 140.

The selection of data to be displayed is user customizable and is typically dependent on one or more characteristics of the element.

In one embodiment, when a part is added to a drawing, its properties are automatically passed onto a new BOM or a new part of an existing BOM using the process described above (FIG. 2).

It should be appreciated that although the invention has been described in the context of a configuration such as shown in FIG. 1, the invention is not limited to such an architecture, and may be implemented in a system having an alternate architecture. For example, the user client need not be part of a local area network, but may directly connect with the external network.

Furthermore, while the invention has been described in the context of a utility which is a plug-in to the CAD application, one embodiment of the invention is as a CAD application that includes the capability of utility 129, and another is as a utility 129, i.e., software that accesses the CAD data without necessarily invoking the CAD application, and provides for associating CAD data with BOM data so that BOM data is available to a user accessing the CAD data or, in another version, such that CAD data is available to a user interacting with BOM data, or in yet another version, making Cad data available to the BOM application and BOM data available to the CAD application.

Furthermore, while one application of the invention is associating CAD data with BOM data, the invention is also applicable to associating any data, not necessarily CAD data with BOM data. The term "CAD data" thus includes any data that is desired to be associated with an item in a BOM.

Note further that although method embodiments of the invention have been described, another embodiment is in the form of a carrier medium carrying one or more computer readable code segments, the code segments implementing the steps of a method.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A computer-implemented method of associating CAD data of an item with a corresponding BOM item in a particular bill of material (BOM) stored with at least one other BOM, the CAD data of the item including CAD information, the method comprising:

collecting the CAD information from the CAD data of the item;

securely transferring the collected CAD information;

retrieving matching data of the corresponding BOM item in the particular BOM from a BOM database containing at least two BOMs, including the particular BOM;

comparing the BOM retrieved matching data with the corresponding collected transferred CAD information to ascertain if there is a match between the CAD data information and the retrieved matching data; and in the case a match is obtained, associating the particular BOM item with the CAD data of the item, wherein each BOM is describable as a tree with each node a BOM item, wherein each BOM has an owner, and wherein the particular BOM and at least one other BOM stored in the BOM database with the particular BOM have different owners.

2. A method as recited in claim 1, wherein each BOM has a set of items, and each item in any BOM has a unique identifier in the BOM database, wherein in the case of a match, the associating of the particular BOM item includes associating the unique identifier of the item with the CAD data.

3. A computer-implemented method comprising:

associating CAD data of at least one item with a BOM item of at least one or more bills of material (BOMs) in a BOM database stored in a processing system, the BOM database arranged for storing a plurality of BOMs, each BOM describable as a tree with each node a BOM item, each BOM item in the BOM database having a unique identifier; and providing remote access to one or more elements of information in the BOM database to one or more users, wherein at least one BOM item in at least one of the BOMs is associated with an owner of a set of owners, and wherein two or more of the BOMs are associated with a respective owner of the set of owners, such that the database may contain BOMs associated with different respective owners.

4. A method as recited in claim 3, wherein the CAD data is stored remotely from the BOM database.

5. A method as recited in claim 3, wherein more than one set of CAD data exists for a particular item, the method including associating each set of data of the particular item with the one related BOM item in at least one BOM, such that the one BOM item is associated to more than one different CAD data sets for associated item.

6. A method as recited in claim 3, further comprising re-associating CAD data of a particular item when one or more conditions are met.

7. A method as recited in claim 6, wherein the one or more conditions include at least one member of the set consisting of:

a settable amount of time has passed since the CAD data of the particular item was last associated, the CAD data of the particular item is saved, and the CAD data of the particular item is backed up.

8. A method as recited in claim 3, further comprising automatically updating the BOM data of a particular BOM item in the BOM database when at least some of the CAD data for the item associated with the particular BOM item is modified.

9. A method as recited in claim 3, wherein the associating of a particular BOM item includes adding information in the data in the BOM database for the BOM item about the associated CAD data of the particular BOM item.

10. A method as recited in claim 9, wherein the added information includes one or more of the identifier for the associated CAD data.

11. A method as recited in claim 9, wherein the added information includes a link to associated CAD data.

12. A method as recited in claim 9, wherein the adding information in the data in the BOM database includes securely transferring the information to be added in the data in the BOM database.

13. A method as recited in claim 3, wherein associating the CAD data of a particular item includes providing a mapping of one or more CAD data fields for the item to the corresponding data fields for the associated item in the BOM that includes the item.

14. A method as recited in claim 13, wherein associating the mapping includes mapping the CAD identifier to the unique identifier of the associated item in the BOM database, such that the BOM data for an item is available to a user of the CAD data.

15. A method as recited in claim 14, further comprising securely moving CAD data about an item to be available to a user of the BOM database such that accessing the BOM data about a particular item provides access to the moved CAD data about the associated item to a user of the BOM data.

16. A method as recited in claim 13, wherein the mapping from the CAD data fields to the corresponding BOM data fields is attached to the CAD data of the particular item.

17. A method as recited in claim 16, wherein the mapping attached to the CAD data of the particular item is in the form of a meta-tag.

18. A method as recited in claim 17, wherein the meta-tag includes an identification key for the unique identifier for the particular item in the BOM data.

19. A method as recited in claim 18, wherein the meta-tag further includes one or more of the set consisting of version information, modification date/time data, location data, and user information data.

20. A method as recited in claim 13, wherein one of the corresponding BOM data fields is the unique identifier used in the BOM for a particular item, and wherein the unique identifier used in the BOM for the particular item is attached to the CAD data of the particular item such that the BOM data related to an item is made available to CAD data for the item.

21. A method as recited in claim 3, wherein the CAD data of at least one item is in a CAD part list such that one or more items in a CAD part list are associated with items in one or more BOMs.

22. A method as recited in claim 21, wherein the associating for a particular item in a part list provides a user accessing the CAD data access to the BOM data of the item that the particular item is associated with in one or more BOMS.

23. A method as recited in claim 3, wherein the associating of a particular CAD item includes:

collecting CAD information on the item from the CAD data of the item for secure transfer.

24. A method as recited in claim 23, wherein the collecting is carried out when one or more conditions are met.

25. A method as recited in claim 23, wherein the associating of a particular CAD item includes:

securely transferring the collected CAD information for matching with BOM data in the BOM database;

identifying matching information in the transferred information;

comparing the matching information in the transferred information with the corresponding BOM data to obtain a match; and associating the matched BOM item with the CAD data of the item.

26. A method as recited in claim 25, further comprising:

formatting the collected CAD information for transfer if required prior to secure transfer.

27. A method as recited in claim 25, wherein the associating the matched BOM item includes securely transferring data to the CAD data.

28. A method as recited in claim 25, wherein the associating of the matched BOM item includes associating the unique identifier of the item in the database containing the BOMs with the CAD data.

29. A method as recited in claim 25, wherein in the case the comparing leads to more than one match, the method further comprises:

presenting information on the matching BOM items to the user such that the user can select one or more matched BOM item for association with the CAD data item.

30. A method as recited in claim 3, wherein the at least one item is a standard part that may be re-used.

31. A computer-implemented method comprising:

comparing one or more features of an item to find matching existing items in one or more of CAD data and in a BOM database, the CAD data for each existing item associated with an existing item in the BOM database, the BOM database storing one or more bills of material (BOMs), each BOM describable as a tree with each node an item, each item in the BOM database having a unique identifier, the BOM database stored remotely from the CAD data;

wherein the BOM database is for storing a plurality of BOMs, wherein at least one item in at least some of BOMs is associated with an owner of a set of owners, and wherein two or more of the BOMs are associated with a respective owner of the set of owners, such that the database may contain BOMs associated with different respective owners.

32. A method as recited in claim 31, wherein the comparison is based on features that include one or more features stored in the BOM database.

33. A method as recited in claim 31, wherein the comparison is based on features that include one or more features stored with the CAD data.

34. A method as recited in claim 31, wherein the comparison includes comparing date information in the CAD data with data in the BOM database.

35. A method as recited in claim 34, wherein the comparing date information requires no user intervention.

36. A method as recited in claim 31, further comprising securely transferring data associated with the CAD data from the BOM database.

37. A carrier medium carrying one or more computer readable code segments to instruct one or more processors of a processing system to implement a method comprising:

associating CAD data of at least one item with an item of at least one or more bills of material (BOMs) in a BOM database stored in a processing system, the BOM database arranged for storing a plurality of BOMs, each BOM describable as a tree with each node an item, each item in the BOM database having a unique identifier; and providing remote access to one or more items of information in the BOM database to one or more users, wherein at least one item in at least some of BOMs is associated with an owner of a set of owners, and wherein two or more of the BOMs are associated with a respective owner of the set of owners, such that the database may contain BOMS associated with different respective owners.

38. A carrier medium as recited in claim 37, wherein more than one set of CAD data exists for a particular item, the method including associating each set of data of the particular item with the one related item in at least one BOM, such that the one BOM item is associated to more than one different CAD data sets for associated item.

39. A carrier medium as recited in claim 37, wherein the associating of a particular item includes adding information in the data in the BOM database for the item about the associated CAD data of the particular item.

40. A carrier medium as recited in claim 37, wherein associating the CAD data of a particular item includes providing a mapping of one or more CAD data fields for the item to the corresponding data fields for the associated item in the BOM that includes the item.

41. A carrier medium as recited in claim 40, wherein associating the mapping includes mapping the CAD identifier to the unique identifier of the associated item in the BOM database, such that the BOM data for an item is available to a user of the CAD data.

42. A carrier medium as recited in claim 37, wherein the associating of a particular CAD item includes:

collecting CAD formation of the item from the CAD data of the item for secure transfer.

43. A carrier medium as recited in claim 42, wherein the associating of a particular CAD item includes:

securely transferring the collected CAD information for matching with BOM data in the BOM database;

identifying matching information in the transferred information;

comparing the matching information in the transferred information with the corresponding BOM data to obtain a match; and associating the matched BOM item with the CAD data of the item.

44. An apparatus comprising:

means for storing a BOM database, the BOM database arranged for storing a plurality of bills of material (BOMs), each BOM describable as a tree with each node an item, each item in the BOM database having a unique identifier means for associating CAD data of at least one item with an item of at least one or more BOMs in the BOM database; and means for providing remote access to one or more items of information in the BOM database to one or more users, wherein at least one item in at least some of BOMs is associated with an owner of a set of owners, and wherein two or more of the BOMs are associated with a respective owner of the set of owners, such that the database may contain BOMs associated with different respective owners.

45. An apparatus as recited in claim 44, wherein more than one set of CAD data exists for a particular item, the apparatus including means for associating each set of data of the particular item with the one related item in at least one BOM, such that the one BOM item is associated to more than one different CAD data sets for associated item.

46. An apparatus as recited in claim 44, wherein the means for associating a particular item includes means for adding information in the data in the BOM database for the item about the associated CAD data of the particular item.

47. An apparatus as recited in claim 44, wherein the means for associating the CAD data of a particular item includes means for providing a mapping of one or more CAD data fields for the item to the corresponding data fields for the associated item in the BOM that includes the item.

48. An apparatus as recited in claim 47, wherein the means for associating the mapping includes means for mapping the CAD identifier to the unique identifier of the associated item in the BOM database, such that the BOM data for an item is available to a user of the CAD data.

49. An apparatus as recited in claim 44, wherein the means for associating a particular CAD item includes:

means for collecting CAD information on the item from the CAD data of the item for secure transfer.

50. An apparatus as recited in claim 49, wherein the means for associating a particular CAD item includes:

means for securely transferring the collected CAD information for matching with BOM data in the BOM database;

means for identifying matching information in the transferred information;

means for comparing the matching information in the transferred information with the corresponding BOM data to obtain a match; and means for associating the matched BOM item with the CAD data of the item.

* * * * *